(12) United States Patent
Inoue et al.

(10) Patent No.: US 10,505,183 B2
(45) Date of Patent: Dec. 10, 2019

(54) NEGATIVE ELECTRODE ACTIVE MATERIAL FOR NONAQUEOUS ELECTROLYTE SECONDARY BATTERIES

(71) Applicant: Mitsui Mining & Smelting Co., Ltd., Tokyo (JP)

(72) Inventors: Daisuke Inoue, Ageo (JP); Yanko Marinov Todorov, Ageo (JP); Shinya Kagei, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/390,695

(22) PCT Filed: Apr. 2, 2013

(86) PCT No.: PCT/JP2013/060090
§ 371 (c)(1),
(2) Date: Oct. 3, 2014

(87) PCT Pub. No.: WO2013/151047
PCT Pub. Date: Oct. 10, 2013

(65) Prior Publication Data
US 2015/0064555 A1 Mar. 5, 2015

(30) Foreign Application Priority Data

Apr. 5, 2012 (JP) .................................. 2012-086762

(51) Int. Cl.
*H01M 4/38* (2006.01)
*H01M 4/134* (2010.01)
(Continued)

(52) U.S. Cl.
CPC .......... *H01M 4/386* (2013.01); *H01M 4/134* (2013.01); *H01M 4/38* (2013.01); *H01M 4/622* (2013.01); *H01M 10/052* (2013.01); *H01M 2004/021* (2013.01); *H01M 2004/027* (2013.01); *H01M 2300/0017* (2013.01)

(58) Field of Classification Search
None
See application file for complete search history.

(56) References Cited

U.S. PATENT DOCUMENTS 6,548,208 B1   4/2003  Kasamatsu et al.
7,141,334 B2  11/2006  Fukui et al.
(Continued)

FOREIGN PATENT DOCUMENTS

JP          11250896 A    9/1999
JP       2000285919 A   10/2000
(Continued)

*Primary Examiner* — Ula C Ruddock
*Assistant Examiner* — Tony S Chuo
(74) *Attorney, Agent, or Firm* — The Webb Law Firm

(57) ABSTRACT

Provided is a novel negative electrode for nonaqueous electrolyte secondary batteries, which is capable of improving cycle characteristics and is also capable of suppressing aggregation of active material particles in a slurry. The negative electrode active material for nonaqueous electrolyte secondary batteries contains silicon and has a D50 of 0.1 μm to 5 μm, and an amount of water measured at 120° C. to 300° C. by the Karl-Fischer method (referred to as "amount of water") per specific surface area (referred to as "CS"), that is, the amount of water/CS, of 0.1 to 80 ppm/(m²/cc).

14 Claims, 3 Drawing Sheets

(51) Int. Cl.
*H01M 4/62* (2006.01)
*H01M 4/02* (2006.01)
*H01M 10/052* (2010.01)

(56) References Cited

U.S. PATENT DOCUMENTS

| | | |
|---|---|---|
| 2006/0040182 A1 | 2/2006 | Kawakami et al. |
| 2007/0202365 A1 | 8/2007 | Sawa et al. |
| 2007/0231698 A1 | 10/2007 | Kawase et al. |
| 2010/0062340 A1 | 3/2010 | Ide |
| 2012/0319038 A1 | 12/2012 | Ide et al. |

FOREIGN PATENT DOCUMENTS

| | | |
|---|---|---|
| JP | 200275351 A | 3/2002 |
| JP | 2003109589 A | 4/2003 |
| JP | 2004311429 A | 11/2004 |
| JP | 2007234336 A | 9/2007 |
| JP | 2007273182 A | 10/2007 |
| JP | 4033720 B2 | 11/2007 |
| JP | 2007305424 A | 11/2007 |
| JP | 4053576 B2 | 2/2008 |
| JP | 2008123814 A | 5/2008 |
| JP | 2008293970 A | 12/2008 |
| WO | 2011111709 A1 | 9/2011 |

[Fig.1]
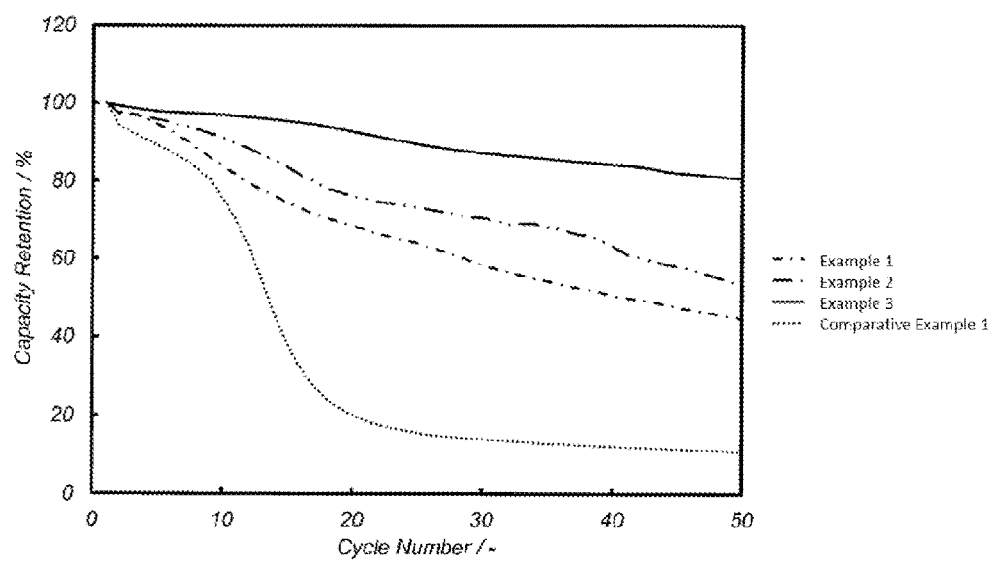

[Fig.2]
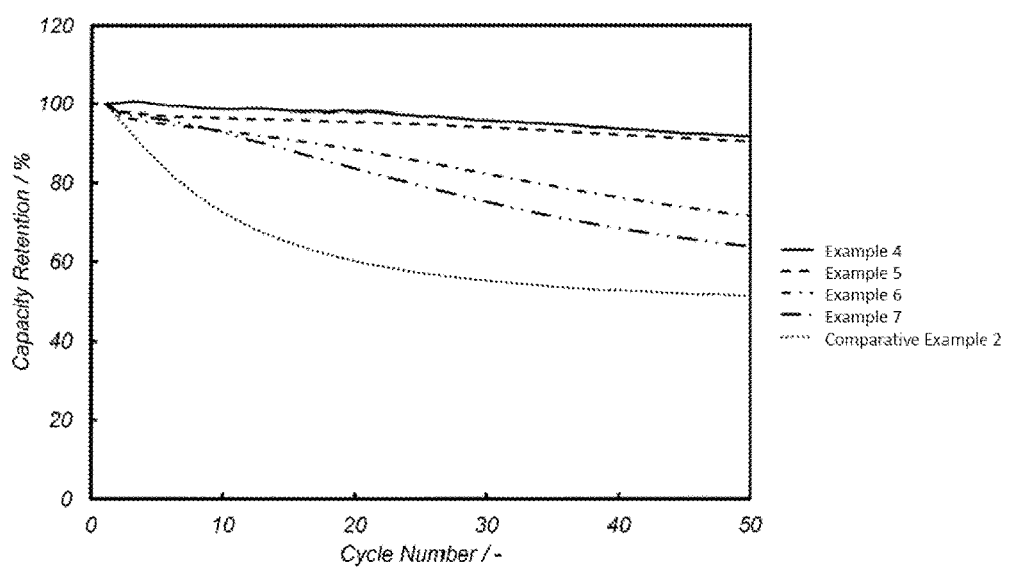

[Fig.3]
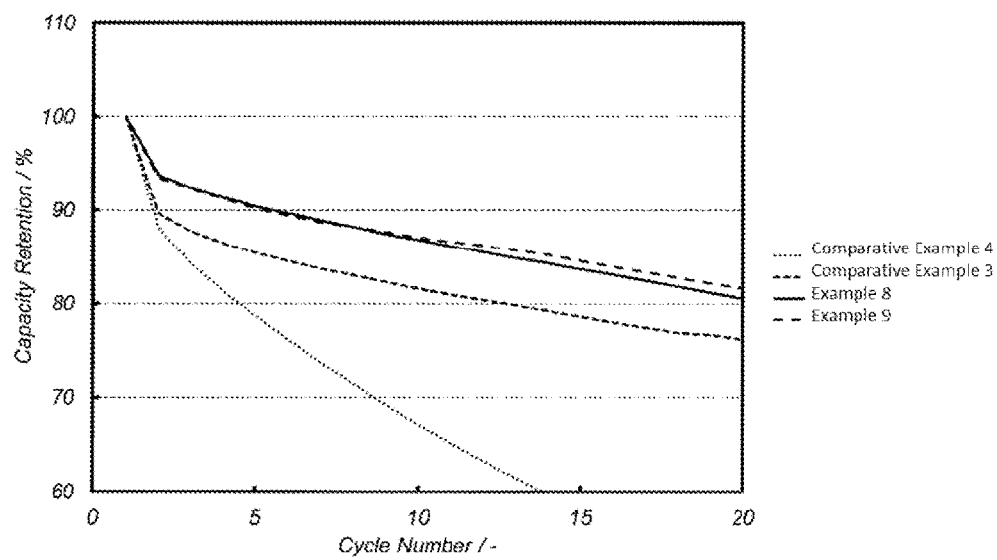

NEGATIVE ELECTRODE ACTIVE MATERIAL FOR NONAQUEOUS ELECTROLYTE SECONDARY BATTERIES

CROSS-REFERENCE TO RELATED APPLICATIONS

This application is the United States national phase of International Application No. PCT/JP2013/060090 filed Apr. 2, 2013, and claims priority to Japanese Patent Application No. 2012-086762 filed Apr. 5, 2012, the disclosures of which are hereby incorporated in their entirety by reference.

TECHNICAL FIELD

The present invention relates to a negative electrode active material that can be used in nonaqueous electrolyte secondary batteries such as lithium secondary batteries.

BACKGROUND ART

A negative electrode for nonaqueous electrolyte secondary batteries is generally produced by mixing particles of an active material formed from a material into which lithium ions can be inserted by charging, with a binder, a conductive material and a solvent, applying the mixture thus obtained on the surface of a current collector, drying the mixture to form a coating film, and further subjecting the coating film to press processing.

In recent years, along with the development in applications such as electric vehicles and smart phones, there is an increasing demand for capacity increase and lengthening of the service life of batteries. Currently, most of the negative electrodes of commercially available batteries use graphite as the negative electrode active material; however, this active material has already reached the theoretical limit in terms of capacity, and it is now necessary to develop new negative electrode active materials. One of the promising candidates thereof is active materials containing silicon (also referred to as "silicon-based active materials").

Silicon-based active materials have a potential that the capacity per mass is 5 to 10 times that of graphite. However, on the other hand, silicon-based active materials have a problem that electron conductivity is not so high compared with graphite. Thus, it has been hitherto suggested, in order to increase the electron conductivity of silicon-based active materials, to add a conductive auxiliary agent for the purpose of imparting electron conductivity between, for example, a current collector and the active material.

For example, it has been proposed in Patent Document 1 to attach particles of a metal material having a particle size of 0.0005 μm to 10 μm to the surfaces of silicon-based active material particles.

Furthermore, it has been proposed in Patent Document 2 to coat the periphery of core particles containing silicon with a silicon solid solution such as $Mg_2Si$, CoSi or NiSi, and to further coat the surface with a conductive material such as graphite or acetylene black.

Also, since silicon-based active materials undergo large volumetric changes caused by insertion and desorption of lithium ions, silicon-based active materials also have a problem that detachment from the active material layer is likely to occur as charging and discharging are repeated, consequently deterioration of cycles or reduction of energy density occurs, the battery performance is decreased, and safety of the battery is decreased.

As a means for solving this problem, the applicant of the present invention previously suggested that an active material layer containing particles of an active material is provided, a metal material having a low ability to form lithium compounds is precipitated between the particles by electroplating, and the surface of the active material layer is coated continuously or non-continuously by a surface layer formed from a metal material of the same kind as the aforementioned metal material (Patent Document 3).

Furthermore, in regard to the silicon-based active materials, suggestions have been made to the effect of enhancing the battery characteristics by controlling the particle size distribution or the particle size.

For example, Patent Document 4 is described, in connection with active material particles containing silicon and/or a silicon alloy, to the effect that when the average particle size of the active material particles is adjusted to from 1 μm to 10 μm, and the particle size distribution is adjusted to a particle size distribution in which 60% by volume or more of the particles have a particle size in the range of from 1 μm to 10 μm, the volume of the active material particles expands and contracts along with the storage and release of lithium resulting from charge and discharge, and thereby an increase in the contact resistance between the active material particles is suppressed.

Patent Document 5 discloses, in connection with a negative electrode active material containing silicon particles, that the active material particles have an average particle size in the range of 7.5 μm to 15 μm, and have a particle size distribution in which 60% by volume or more of the particles have a particle size in the range of average particle size ±40%. It is disclosed to the effect that when the average particle size of the active material particles is adjusted to 7.5 μm or more, the number of particles per volume that exist in the thickness direction of the active material layer becomes smaller, and therefore, the number of particles that should be brought into contact with each other in order to obtain current collectability becomes smaller, so that satisfactory current collectability can be obtained.

Patent Document 6 discloses active material particles containing silicon, which have an average particle size of from 5 μm to 25 μm. When the average particle size of the active material particles is adjusted to 5 μm or more, the original specific surface area of the active material can be reduced. It is described to the effect that since the contact area between the electrolyte and the newly generated surfaces of the active material can be reduced thereby, the effect of enhancing the cycle characteristics and the effect of suppressing swelling of the active material are increased.

CITATION LIST

Patent Document

Patent Document 1: JP 11-250896 A
Patent Document 2: JP 2000-285919 A
Patent Document 3: Japanese Patent No. 4053576
Patent Document 4: Japanese Patent No. 4033720 (JP 2004-22433 A)
Patent Document 5: JP 2007-234336 A
Patent Document 6: JP 2008-123814 A In the case of using a silicon-based active material as a negative electrode active material, regarding the means for enhancing the cycle characteristics, it can be considered to reduce the particle size of the silicon-based active material, and to thereby enhance reactivity of the particles. However, when the particles of the silicon-based active material are made small, since the particles easily aggregate in a slurry at the time of electrode production, handling ability is deteriorated. Also, it is necessary to increase the amounts of the binder and the conductive auxiliary agent, and there is a concern that the capacity per unit volume may be decreased.

Thus, an object of the present invention is to provide a new negative electrode for nonaqueous electrolyte secondary batteries, which can improve the cycle characteristics by enhancing reactivity of the negative electrode active material particles, and can also suppress aggregation of the negative electrode active material particles in a slurry.

SUMMARY OF THE INVENTION

The present invention is to propose a negative electrode active material for nonaqueous electrolyte secondary batteries containing silicon, characterized in that the D50 according to a laser diffraction scattering type particle size distribution analysis method is 0.1 μm to 5 μm, and the amount of water measured at 120° C. to 300° C. by the Karl-Fischer method (referred to as "amount of water") per specific surface area (referred to as "CS"), that is, the amount of water/CS, is 0.1 to 80 ppm/(m²/cc).

Effect of the Invention

Since the negative electrode active material for nonaqueous electrolyte secondary batteries provided by the present invention is an active material containing silicon, an increase in the capacity of batteries can be promoted as compared with graphite. Furthermore, since the particles are fine particles having a D50 of 0.1 μm to 5 μm, the negative electrode active material particles have high reactivity, and the cycle characteristics of the battery can be enhanced. In addition to that, the battery can be made to have excellent uniform reactivity.

However, when the negative electrode active material particles containing silicon are fine particles, usually aggregation of the negative electrode active material particles is prone to occur, and therefore, fluidity is decreased. As a result, the negative electrode active material particles generally cause a problem that the binding strength to the binder is decreased so that strength of the electrode is decreased, or deterioration of the active material itself is prone to proceed due to high reactivity. However, the present invention controls the amount of water measured at 120° C. to 300° C. by the Karl-Fischer method (referred to as "amount of water") per specific surface area (referred to as "CS") to a predetermined range. In other words, such problems caused by micronization could be solved by controlling the amount of hydroxyl groups at the surface of the negative electrode active material particles to a predetermined range. That is, aggregation of the negative electrode active material particles in a slurry could be suppressed, strength of the electrode could be increased by increasing the binding strength to the binder, and thereby the cycle characteristics of the battery could be further increased.

BRIEF DESCRIPTION OF DRAWINGS

FIG. 1 is a graph showing the results of a charge-discharge cycle characteristics test carried out for Examples 1 to 3 and Comparative Example 1;

FIG. 2 is a graph showing the results of a charge-discharge cycle characteristics test carried out for Examples 4 to 7 and Comparative Example 2; and FIG. 3 is a graph showing the results of a charge-discharge cycle characteristics test carried out for Examples 8 and 9 and Comparative Examples 3 and 4.

DETAILED DESCRIPTION AND BEST MODE(S) FOR CARRYING OUT THE INVENTION

<Present Negative Electrode Active Material>

The negative electrode active material for nonaqueous electrolyte secondary batteries according to an exemplary embodiment of the present invention (hereinafter, referred to as "present negative electrode active material") is a negative electrode active material containing silicon.

The present negative electrode active material may be composed of a silicon-containing material such as, for example, pure silicon; a silicon oxide such as SiO or $SiO_2$; a silicon alloy such as $SiB_4$, $SiB_6$, $Cu_5Si$, $FeSi_2$, or $Mg_2Si$; or a silicon compound such as $Si_3N_4$ or SiC. At this time, it is implied that the present negative electrode active material also includes materials obtained by incorporating one or two or more elements selected from the group consisting of Ni, B, Co, Ti, Fe, In, Ag, Cu and Nb to these silicon oxides, silicon alloys and silicon compounds. In that case, the elements may be contained in any state, and for example, the elements may be contained in a solid solution state.

The present negative electrode active material may also be a material in which one kind or two or more kinds of elements selected from the group consisting of transition metal elements, the semi-metal elements or metal elements of Group 3, the semi-metal elements or metal elements of Group 4 (provided that silicon is excluded), and the non-metal or semi-metal elements of Group 5 (these are collectively referred to as "additive elements") are incorporated into one of the silicon-containing materials described above. Preferably, the negative electrode active material may also be a material in which the relevant additive elements are solid-solubilized in one of the silicon-containing materials (referred to as "silicon solid solution"). Also, the negative electrode active material may also be a mixture of such a silicon solid solution and the silicon-containing materials.

When the particle size of the present negative electrode active material is decreased, the specific surface area is increased. Therefore, deterioration of the negative electrode active material caused by side reactions such as decomposition of the electrolyte at the time of charging and discharging, is likely to occur. Thus, when the additive elements such as described above are solid-solubilized, the extent of deterioration of the negative electrode active material caused by side reactions such as decomposition of the electrolyte is decreased, and corrosion can be suppressed. Furthermore, generation of side reaction products not only causes electrode swelling, but also causes troubles such as consumption of lithium that is active in the electrode reaction. From such a point of view, among the additive elements described above, boron, phosphorus and iron are preferred, and among them, boron is particularly preferred from the viewpoint of suppressing the reactivity with the electrolyte. In this case, it may be considered that as a result of boron being solid-solubilized into silicon, many holes are introduced into a solid solution. Since the side reactions of a electrolyte on a negative electrode active material are mainly electrophilic reactions, it may be considered that when many holes exist in the negative electrode active material, the side reactions thereof are reduced.

When an additive element such as boron (B) is solid-solubilized, the content of the relevant additive element is preferably 0.01 atom % to 10 atom %, particularly preferably 1 atom % or more, or 6 atom % or less, and among others, preferably 1 atom % or more, or 3 atom % or less. These values are fairly higher than the conventional cases, and include even a range beyond the theoretical values.

In order to increase the amount of solid solution of the additive element, for example, the increase can be realized by micronizing the active material by a steam explosion atomization method that will be described below, or by micronizing the active material by a water atomization method. However, the present invention is not intended to be limited to such methods.

When an additive element such as boron (B) is solid-solubilized, it is preferable to precipitate the relevant additive element on the grain boundaries by performing a heat treatment, from the viewpoint of enhancing the battery characteristics.

As described above, the present negative electrode active material may be formed from the silicon-containing material described above, may be formed from the silicon solid-solution, or may be formed from a mixture of the silicon solid solution and the silicon-containing material. Furthermore, the present negative electrode material may also be formed from a mixture of these with a silicon alloy.

In this case, examples of the relevant silicon alloy include alloys of silicon and transition metals, and examples of the relevant transition metal include iron, nickel, titanium, cobalt, and copper. Also, the silicon alloy may be an alloy between silicon and niobium.

(Particle Shape)

The particle shape of the present negative electrode active material is not particularly limited. For example, a spherical shape, a polyhedral shape, a spindle shape, a plate shape, a scale shape, or an amorphous shape, or a combination of those can be used. For example, it has been confirmed that the negative electrode active material becomes spherical by gas atomization, and when the active material is pulverized by a jet mill or the like, since particles are split along the grain boundaries, the particles acquire amorphous shapes.

(D50)

The laser diffraction scattering type particle size distribution analysis method is a measurement method of regarding an aggregated granule as a single particle (aggregated particle), and calculating the particle size thereof. The D50 according to that analysis method means the 50% cumulative volume particle size, that is, the diameter of cumulative 50% from the finer side of the cumulative percentage notation of the particle size measurement values calculated relative to the volume in a volume-based particle size distribution chart.

The D50 of the present negative electrode active material is preferably 0.1 µm to 6 µm, particularly preferably 0.1 µm or more, or 4 µm or less, and among others, particularly more preferably 3 µm or less. When the particle size is adjusted to such a range, reactivity of the negative electrode active material particles is increased so that the cycle characteristics can be increased. Also, the electrode can have excellent uniform reactivity, and the cycle characteristics are also enhanced thereby. Furthermore, a decrease in the volume energy density can be suppressed.

In order to adjust the D50 of the present negative electrode active material to the range described above, for example, it is desirable to micronize the active material by a steam explosion atomization method that will be described below, and to conduct pulverization by a jet mill or the like at the same time. However, the present invention is not intended to be limited to such a production method.

(Amount of Water Per Specific Surface Area)

The present negative electrode active material is such that the amount of water measured at 120° C. to 300° C. by the Karl-Fischer method (referred to as "amount of water") per specific surface area (referred to as "CS"), that is, the amount of water/CS, is preferably 0.1 to 80 ppm/(m²/cc), more preferably 0.1 ppm/(m²/cc) or more, or 70 ppm/(m²/cc) or less, and among others, particularly preferably 0.1 ppm/(m²/cc) or more, or 60 ppm/(m²/cc) or less. In the present specification, "ppm/(m²/cc)" may be expressed simply as "ppm/CS" in some cases.

The "amount of water/CS" as such may be said to be a basis of the amount of hydroxyl groups at the surface of the negative electrode active material. When the amount of water/CS is controlled to the desired range, not only the aggregation of the negative electrode active material particles in a slurry caused by particle size reduction can be suppressed, but also the influence of the hydroxyl groups at the active material surface exerted on the deterioration of the cycle characteristics by trapping Li during the battery reaction, can be suppressed.

In order to adjust the amount of water of the present negative electrode active material to the range described above, it is desirable to perform drying, pulverizing in a non-oxygen atmosphere, making the particle size distribution sharp by classifying the particles after pulverization, or the like. Specifically, the amount of water can be adjusted by adjusting the ratio of nitrogen and air in the atmosphere at the time of pulverization. However, the present invention is not intended to be limited to such a method.

The amount of water defined in the present invention is the amount of water immediately before preparing a slurry and applying the slurry. Therefore, if the amount of water increases during storage, it is preferable to adjust the amount of water to the amount of water defined in the present invention by drying, and then use the negative electrode active material so as to prepare a slurry.

The "specific surface area (CS)" means the specific surface area in the case of assuming the particles to be spherical, and can be measured using, for example, a laser diffraction particle size distribution analyzer (also referred to as "MICROTRAC").

In general, the specific surface area per unit volume, Sv, in a powder can be represented by the following formula (1), and when the powder is assumed to be spherical, formula (1) is converted to formula (2). Therefore, the specific surface CS of MICROTRAC can be calculated by formula (3). Here, since MA in formula (3) is obtained from formula (4), formula (3) can be rewritten as formula (5).

Formula (1)

$$Sv = \frac{Ks}{\frac{\Sigma ni/di^3}{\Sigma ni/di^2}} \quad (Ka: \text{shape coefficient}) \qquad (1)$$

Formula (2)

$$Sv = \frac{Ks}{\frac{\Sigma ni/di^3}{\Sigma ni/di^2}} = \frac{6}{ds} \quad (ds: \text{surface area mean diameter}) \qquad (2)$$

Formula (3)

$$Cs = \frac{6}{MA} \quad (3)$$

$$MA = \frac{\Sigma Vi}{\Sigma\left(\frac{Vi}{di}\right)} = \frac{100\%}{\Sigma\left(\frac{Vi}{di}\right)} \quad \text{Formula (4)}$$

$$Cs = 0.06 \, \Sigma\left(\frac{Vi}{di}\right) \quad \text{Formula (5)}$$

(Method for Producing Present Negative Electrode Active Material)

The present negative electrode active material can be produced by heating the silicon-containing material to obtain a molten liquid, or mixing the additive elements to the silicon-containing material and heating the mixture to obtain a molten liquid, or heating the silicon-containing material to obtain a molten liquid, and adding the additive elements to this molten liquid to obtain a molten liquid, subsequently micronize the active material by an atomization method or the like, and performing classification to thereby adjust the particle size. Alternatively, the present negative electrode active material can be produced by obtaining a molten liquid as described above, subsequently performing casting by a roll casting method, and performing pulverization and classification in a non-oxygen atmosphere to thereby adjust the particle size.

Regarding the atomization method, for example, it is preferable to employ a method of micronizing a molten metal dropped into a cooling medium by utilizing the pressure wave generated by inducing boiling by spontaneous nucleation, using the apparatus described in FIG. 2 of WO 01/081033 (this micronization method is referred to as a "steam explosion atomization method" in the present specification). However, the present invention is not intended to be limited to such an atomization method.

<Negative Electrode>

The negative electrode related to this exemplary embodiment (hereinafter, referred to as "present negative electrode") is a negative electrode for nonaqueous electrolyte secondary batteries, in which a coating film containing the present negative electrode active material, a binder, optionally a conductive material, and optionally graphite as a negative electrode active material is provided on a current collector.

(Binder)

Regarding the binder, any of a polyimide, a polyamide and a polyamideimide may be used. These may be used singly, or two or more kinds thereof may be used in combination (hereinafter, these may also be collectively referred to as "polyimide and the like"). A binder other than these may also be used in combination therewith.

Regarding the polyimide and the like described above, commercially available products can be used without limitations. Particularly for the polyamide, it is preferable to use a polyamide having a glass transition point Tg of 200° C. to 400° C. Also for the polyamideimide, it is preferable to use a polyamideimide having a glass transition point Tg of 200° C. to 400° C.

It is preferable that the polyimide and the like described above be fixed to at least a portion of the surface of the negative electrode active material particles (hereinafter, when simply described as "active material particles", this means "negative electrode active material particles").

One embodiment of the form of fixation of the polyimide and the like is a form in which the polyimide and the like are fixed planarly in at least a portion of the surface of the active material particles. The term "planarly" has the same meaning as film-like, and means a state that is opposite to the state in which objects are scattered in a dotted fashion. Furthermore, the term "fixation" means a state in which the active material particles and the polyimide and the like are bonded in a state in which a mechanical bonding force (for example, an anchoring effect such as engagement or interdigitation) or a chemical bonding force is generated. A state in which the active material particles and the polyimide and the like are simply mixed, and consequently the two components are only in contact with each other, does not correspond to "fixation".

The method for fixing the polyimide and the like planarly onto the surface of the active material particles will be described below.

It is preferable that the polyimide and the like do not cover the entirety of the surface of the active material particles, but be fixed to the surface in the form in which there are areas where the polyimide and the like are not fixed, remaining on the surface of the active material particles. Furthermore, it is preferable that adjacent active material particles are in contact with each other in the areas where the polyimide and the like are not fixed, and at the same time, the polyimide and the like are fixed and connected to the periphery of the contact points. As such, electron conductivity can be secured by bringing the active material particles into contact through areas where the polyimide and the like are not fixed.

It is preferable that the polyimide and the like that are fixed planarly to the surface of the active material particles, are connected integrally through the connection sites formed by the polyimide and the like that are fixed to the surface of other active material adjoining the relevant particles. That is, as discussed above, the active material particles are preferably such that adjacent particles are in contact with each other, and also, the polyimide and the like that are fixed to the periphery of the contact points thereof are connected to each other and form connection sites.

The connection sites formed by the polyimide and the like can be elongated while maintaining a fixed state with the particles when lithium ions are inserted into the active material particles, and thus the active material particles undergo expansion. Thereby, detachment of the active material particles from the active material layer caused by expansion is effectively prevented, and the cycle characteristics at the time of charging and discharging are enhanced. Furthermore, this also contributes to the suppression of increase in the thickness of the battery resulting from charging. Suppression of increase in the thickness of the battery resulting from charging is particularly effective when the negative electrode of the present invention is applied to a battery that is used in a place where the battery storage space is limited, as in the case of the battery for mobile telephones. On the other hand, when lithium ions are released from the active material particles due to discharging, the particles undergo contraction. Therefore, the connection sites can also under contraction along with the contraction of the particles. As such, since the connection sites formed by the polyimide and the like are connecting between the active material particles in a manner similar to that of a spring, the particles are effectively prevented from being detached from the active material layer.

In addition to that the active material particles are connected with each other through connection sites formed by the polyimide and the like, it is more preferable that plural active material particles are connected in a rosary shape through the connection sites described above. At this time, the rosary-like connection may be a straight form, or may be a meandering form. Also, the rosary-like connection may be in a literally cyclic form, or may be in a non-cyclic form.

In addition, the rosary-like connection may be in the form of a single line, or may be in a branched form. When plural active material particles are connected in a rosary shape, the increase in volume caused by expansion of the active material particles is further relieved by the rearrangement of the rosary-like connection, and the increase in the thickness of the battery resulting from charging is further suppressed.

In order to have plural active material particles connected in a rosary shape as such, for example, a negative electrode mixture may be applied on a current collector, and then, as will be described below, the negative electrode mixture may be dried by heating at a relatively low temperature. However, the present invention is not intended to be limited to this method. It is speculated to be possibly such that when the negative electrode mixture is not dried rapidly but is dried mildly, there occur pathways through which the solvent is volatilized, and the active material particles are arranged along these pathways.

The proportion of the polyimide and the like contained in the active material layer is preferably 1% to 15% by mass, and particularly more preferably 2% by mass or more, or 10% by mass or less, relative to the mass of the active material particles. The proportion of the polyimide and the like contained in the active material layer can be measured by the following method.

Since the negative electrode of the present invention does not contain any organic material other than the polyimide and the like, the proportion of the polyimide and the like contained in the active material layer can be calculated by determining the mass of organic materials by subtracting the mass of elements other than the organic materials contained in the negative electrode, that is, the mass of inorganic materials such as Si, Cu, Al, Fe, Ca, F, P and C, from the mass of the negative electrode, and dividing the mass of the organic materials by the mass of the active material layer. Specifically, the mass of the negative electrode is first measured. Furthermore, the active material layer is removed from the negative electrode, and the mass of the current collector is measured. Subsequently, the negative electrode is completely dissolved, and the total mass of inorganic materials is measured using an ICP emission analyzer. Then, the mass of organic materials is calculated by subtracting the total mass of inorganic materials from the mass of the negative electrode. Also, the mass of constituent materials other than the current collector is calculated out of the total mass of inorganic materials, and the mass of the active material layer is calculated by adding the value thus calculated and the mass of organic materials. The mass of organic materials is divided by the mass of the active material layer, and the resultant is multiplied by 100. Thus, the proportion of the polyimide and the like contained in the active material layer can be calculated.

(Conductive Material)

Regarding the conductive material, for example, a fine metal powder or a powder of a conductive carbon material such as acetylene black can be used. In the case of using a fine metal powder as the conductive material, it is preferable to use a fine powder of a metal having lithium ion conductivity, such as Sn, Zn, Ag or In, or of an alloy of these metals.

(Graphite)

By adding graphite as a negative electrode active material to the present negative electrode active material, increase in capacity attributable to silicon, and satisfactory cycle characteristics attributable to graphite can be both obtained.

(Mixing Composition)

The content of the binder in the present negative electrode is preferably 1 part to 15 parts by mass, and particularly preferably 2 parts by mass or more, or 10 parts by mass or less, relative to 100 parts by mass of the present negative electrode active material.

Furthermore, in the case of incorporating a conductive material, the content of the conductive material is preferably 1 part to 10 parts by mass, and particularly preferably 2 parts by mass or more, or 5 parts by mass or less, relative to 100 parts by mass of the present negative electrode active material.

Furthermore, in the case of incorporating graphite as a negative electrode active material, the content of graphite is preferably such that the mixing mass ratio of the present negative electrode active material and graphite is 0.5:95 to 50:50, and particularly 10:90.

(Method for Producing Present Negative Electrode)

The present negative electrode can be formed by mixing the present negative electrode active material (particulate), a binder, a conductive material, and a solvent to prepare a negative electrode mixture, applying this negative electrode mixture on the surface of a current collector formed from Cu or the like, drying the negative electrode mixture to thereby form a negative electrode active material layer, and then pressing the active material layer if necessary.

Regarding the drying after the application of the negative electrode mixture on the surface of a current collector, it is preferable to conduct drying in a non-oxygen atmosphere, for example, in an argon atmosphere, for 1 hour to 10 hours, and particularly for 1 hour to 7 hours.

Here, the method for producing the present negative electrode in the case of using a polyimide as the binder will be explained.

First, the present negative electrode active material (particulate), a polyimide precursor compound, an organic solvent such as N-methyl-2-pyrrolidone, and optionally a conductive material such as a fine metal powder or acetylene black are mixed, thereby a negative electrode mixture is prepared, and this negative electrode mixture is applied on the surface of a current collector formed from Cu or the like.

At this time, polyamic acid (polyamide acid) can be used as the polyimide precursor compound.

When the negative electrode mixture is applied on the surface of a current collector, the coating film is heated to thereby volatilize the organic solvent, and also the polyimide precursor compound is polymerized. Thus, a polyimide can be produced.

At this time, by regulating the polymerization conditions for the relevant precursor compound, the polyimide can be fixed planarly to the surface of the active material particles, and the active material can be connected in a rosary shape through the connection sites formed by the polyimide.

Regarding the polymerization conditions for the precursor compound, it has been found as a result of the investigations of the inventors of the present invention that it is advantageous to carry out heating in multiple stages. Particularly, it is advantageous to carry out heating in at least two stages, suitably in at least three stages, and more preferably in 4 stages. For example, in the case of performing heating in two stages, it is preferable to perform heating of a first stage at 100° C. to 150° C., and it is preferable to perform heating of a second stage at 200° C. to 400° C.

In regard to the heating time, it is preferable to set the heating time of the first stage to be equal to the heating time of the second stage, or to be longer than the heat time of the second stage. For example, it is preferable to set the heating time of the first stage to 120 minutes to 300 minutes, and particularly preferably to 180 minutes or longer, or 240 minutes or shorter, and to set the heating time of the second stage to 30 minutes to 120 minutes, and particularly preferably to 30 minutes to 60 minutes.

In the case of performing heating in three stages, it is preferable to employ a heating temperature that is intermediate between the temperatures of the first stage and the second stage in relation to the heating of two stages as described above.

This intermediate heating is preferably carried out at 150° C. to 190° C. It is preferable to set the heating time to be equal to the time of the first stage and the second stage, or to a time period that is intermediate between the heating times of the first stage and the second stage. That is, in the case of performing heating in three stages, it is preferable to set the heating times of the various stages to be equal, or to shorten the heating time as the stage progresses.

Furthermore, in the case of performing heating in four stages, it is preferable to employ a heating temperature higher than that of the third stage.

It is preferable to perform heating in an inert atmosphere of argon or the like, regardless of how many stages heating is carried out.

Furthermore, at the time of performing a heating treatment, it is also preferable to press the active material layer with a pressing member such as a glass plate. It is because when the active material layer is treated in this manner, polyamic acid can be polymerized in a state in which the organic solvent is abundant, that is, in a state as if the polyamic acid is saturated in the organic solvent, and therefore, the molecular chains of the polyimide thus produced are easily entangled.

When multistage heating is carried out as described above, the organic solvent contained in the negative electrode mixture can be gradually volatilized. Accordingly, the polyamide precursor compound can be made to have a sufficiently high molecular weight, and also, the polyimide can be fixed over a wide range of the surface of the active material particles. Also, voids can be formed inside the active material layer in the form of a three-dimensional network extending over the entirety of the thickness direction of the layer.

Meanwhile, in the case of using a polyamide or a polyamideimide as well, a heat treatment can be carried out similarly to the case of the polyimide. However, when a polyamide or a polyamideimide is used, it is preferable to form an active material layer by applying a negative electrode mixture containing a polyamide or a polyamideimide and particles of the active material on the surface of a current collector, and then drying the coating film in a temperature range of Tg−100° C. to Tg+100° C. (wherein Tg represents the glass transition point of the polyamide or polyamideimide), and particularly in a temperature range of Tg−100° C. to Tg. It has been found as a result of investigations carried out by the inventors of the present invention that the cycle characteristics are further enhanced by performing drying as such. A further enhancement of the cycle characteristics becomes more noticeable when the drying process described above is carried out in a temperature range of Tg−50° C. to Tg+50° C., and among others, particularly in a temperature range of Tg−50° C. to Tg.

The glass transition point of the polyamide or polyamideimide is measured using a TG-DTA6200 (manufactured by Seiko Instruments, Inc.) in an argon atmosphere, by setting the scan speed at 5° C./min.

<Nonaqueous Electrolyte Secondary Battery>

The nonaqueous electrolyte secondary battery related to this exemplary embodiment (referred to as "present secondary battery") may be configured to include the present negative electrode, a positive electrode, a separator, a nonaqueous electrolyte, and the like.

(Positive Electrode)

A positive electrode has, for example, a positive electrode active material layer formed on at least one surface of a current collector. The positive electrode active material layer contains a positive electrode active material. Regarding the positive electrode active material, any active material conventionally known in the pertinent technical field can be used without any particular limitations. For example, various lithium-transition metal composite oxides can be used. Examples of such materials include $LiCoO_2$, $LiNiO_2$, $LiMnO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (wherein $0<x<1/3$), $LiFePO_4$, and $LiMn_{1-z}M_zPO_4$ (wherein $0<z\leq0.1$, and M represents at least one metal element selected from the group consisting of Co, Ni, Fe, Mg, Zn, and Cu).

(Separator)

Regarding the separator that is used together with the negative electrode and the positive electrode, a non-woven fabric made of a synthetic resin, porous films of polyolefins such as polyethylene or polypropylene, or of polytetrafluoroethylene, and the like are preferably used.

(Nonaqueous Electrolyte)

A nonaqueous electrolyte is formed from a solution in which a lithium salt as a supporting electrolyte is dissolved in an organic solvent. Regarding the organic solvent, for example, use is made of one kind or a combination of two or more kinds of carbonate-based organic solvents such as ethylene carbonate, propylene carbonate, dimethyl carbonate, methyl ethyl carbonate, and diethyl carbonate; and fluorine-based organic solvents obtained by partially fluorinating the carbonate-based organic solvents, such as fluoroethylene carbonate. Specifically, fluoroethylene carbonate, diethyl fluorocarbonate, dimethyl fluorocarbonate, and the like can be used. Examples of the lithium salt include $CF_3SO_3Li$, $(CF_3SO_2)NLi$, $(C_2F_5SO_2)_2NLi$, $LiClO_4$, $LiAlCl_4$, $LiPF_6$, $LiAsF_6$, $LiSbF_6$, $LiCl$, $LiBr$, $LiI$, and $LiC_4F_9SO_3$. These can be used singly or in combination of two or more kinds thereof.

Explanation of Terms

When the expression "X to Y" (X and Y being arbitrary numbers) is used in the present specification, unless particularly stated otherwise, the expression includes the meaning of "X or more and Y or less", as well as the meaning of "preferably more than X" or "preferably less than Y".

Furthermore, when the expression "X or more" (X being an arbitrary number) or "Y or less" (Y being an arbitrary number) is used, the meaning to the effect of "being preferably more than X" or "being preferably less than Y" is also included.

EXAMPLES

Hereinafter, the present invention will be described in more detail by way of Examples. However, the scope of the present invention is not intended to be limited by such Examples.

<Measurement of Amount of Water According to Karl-Fischer Method>

For each of the negative electrode active materials (powders) obtained in Examples and Comparative Examples, the amount of water released when the active material was heated to 120° C. to 300° C. under the conditions described below was measured using a Karl-Fisher moisture meter as described below, and the amount of water at 120° C. to 300° C. was determined.

Apparatus: Moisture vaporizing apparatus "KEMADP-611"/Karl-Fischer moisture meter "MKC-610-DJ"

Measurement: The amount of water at 120° C. was measured, subsequently the temperature was increased to 300° C., the amount of water at from 120° C. to 300° C. was measured, and thus the amount of water at 120° C. to 300° C. was determined.

Temperature increase: 10° C./min

Flow rate: argon at 70 mL/min

Reagent: HYDRANAL COULOMAT AG and HYDRANAL COULOMAT CG

<D50 and Specific Surface Area (CS)>

Each of the negative electrode active materials (powders) obtained in Examples and Comparative Examples was introduced into a water-soluble solvent using a sample circulator for a laser diffraction particle size distribution analyzer ("MICROTRAC No. 9320-X100" manufactured by Nikkiso Co., Ltd.), and the mixture was irradiated with ultrasonic waves at 30 watts for 150 seconds at a flow rate of 40 mL/sec. Subsequently, the particle size distribution was measured using a laser diffraction particle size distribution analyzer manufactured by Nikkiso Co., Ltd., "HRA(X100)", and thus the D50 and the specific surface area (CS) were determined from the volume-based particle size distribution chart thus obtained.

Example 1

(1) Production of Negative Electrode Active Material

An ingot of silicon (Si) was heated to melt, and the molten liquid that had been heated to 1600° C. was subjected to steam explosion atomization using the apparatus described in FIG. 2 of WO 01/081033. At this time, the inner diameter of the cylindrical mixing nozzle 2 was set to 2.0 mm, and the amount of the coolant circulating in the mixing nozzle was set to 100 L/min. Water at room temperature was used as the coolant. A molten liquid of silicon was dropped (free-fall dropping) into the mixing nozzle 2 in an amount of 13 g each. The cooling rate at this time was estimated to be $10^6$ K/s to $10^8$ K/s according to the estimation method described above.

The silicon powder obtained by the steam explosion atomization was further subjected to particle size adjustment using a jet mill pulverizer in a nitrogen atmosphere (air in an amount of less than 1%, the balance being nitrogen vaporized from liquefied nitrogen (purity 99.999% or more), and thus a fine silicon powder (D50: 0.5 μm) was obtained as the negative electrode active material. The amount of water/CS at that time was 58 ppm/CS, and the results are presented in Table 1.

(2) Preparation of Negative Electrode Mixture

A negative electrode mixture was obtained by mixing 50 parts by mass of the fine silicon powder obtained as described above, 50 parts by mass of graphite as a negative electrode active material, 5 parts by mass of a conductive material (acetylene black), 5 parts by mass of a polyimide precursor compound (polyamic acid), and 100 parts by mass of N-methyl-2-pyrrolidone.

(3) Production of Negative Electrode

The negative electrode mixture prepared as described above was applied on one surface of an electrolyte copper foil such that the surface capacity was 3.5 mAh/cm². Subsequently, the coating film was heated in an argon atmosphere under reduced pressure to achieve polymerization of the precursor compound, and thus a negative electrode was produced.

Heating was carried out in four stages. Heating of a first stage was carried out at 120° C. for 4 hours, heating of a second stage was carried out at 150° C. for 1 hour, heating of a third stage was carried out at 200° C. for 1 hour, and heating at a fourth stage was carried out at 300° C. for 1 hour. During heating, the current collector having the coating film formed thereon was sandwiched between two sheets of glass plates.

For the negative electrode obtained as described above, the vicinity of the interface of the current collector in a vertical cross-section of the active material layer was observed with a scanning microscope, and the polyimide was fixed planarly to the surface of the active material particles formed of silicon. Furthermore, adjoining active material particles were in contact with each other, and also, adjoining active material particles were connected into a rosary form by connection sites formed by polyimide. Furthermore, the active material particles and the current collector were also connected by the connection sites formed by polyimide.

Examples 2 to 7

Negative electrode active materials were obtained in the same manner as in Example 1, except that the proportion of nitrogen and air of the atmosphere at the time of jet mill pulverization was changed, and also, the degree of pulverization was changed. The D50 and the amount of water/CS of these materials are presented in the following Table 1.

Furthermore, negative electrodes were obtained in the same manner as in Example 1, except that at the time of preparing the negative electrode mixture, the mixing mass ratio of the fine silicon powder and graphite was changed to fine silicon powder:graphite=50:50 in Examples 2 and 3, and to fine silicon powder:graphite=10:90 in Examples 4 to 7.

Example 8

(1) Production of Negative Electrode Active Material

An ingot of silicon (Si) was heated to melt, and the molten liquid that had been heated to 1600° C. was subjected to a micronization treatment by a steam explosion atomization method using the apparatus described in FIG. 2 of WO 01/081033. At this time, the inner diameter of the cylindrical mixing nozzle 2 was set to 2.0 mm, and the amount of the coolant circulating in the mixing nozzle was set to 100 L/min. Water at room temperature was used as the coolant. A molten liquid of silicon was dropped (free-fall dropping) into the mixing nozzle 2 in an amount of 13 g each. The cooling rate at this time was estimated to be $10^6$ K/s to $10^8$ K/s according to the estimation method described above.

The powder obtained by the steam explosion atomization was subjected to jet mill pulverization in a nitrogen atmosphere, and thus a negative electrode active material (D50: 2.5 µm) was obtained. The amount of water/CS at that time was 31 ppm/CS, and the results are presented in Table 1.

(2) Preparation of Negative Electrode Mixture

A negative electrode mixture was obtained by mixing 100 parts by mass of the negative electrode active material (powder) obtained as described above, 5 parts by mass of a conductive material (acetylene black), 5 parts by mass of a polyimide precursor compound (polyamic acid), and 100 parts by mass of N-methyl-2-pyrrolidone.

(3) Application and Heating Treatment of Negative Electrode Mixture

The negative electrode mixture prepared as described above was applied on one surface of an electrolytic copper foil to obtain a coating thickness of 12 µm. Subsequently, the coating film was heated in an argon atmosphere under reduced pressure to achieve polymerization of the precursor compound, and thus a negative electrode was produced.

Heating was carried out in four stages. Heating of a first stage was carried out at 120° C. for 4 hours, heating of a second stage was carried out at 150° C. for 1 hour, heating of a third stage was carried out at 200° C. for 1 hour, and heating at a fourth stage was carried out at 300° C. for 1 hour. During heating, the current collector having the coating film formed thereon was sandwiched between two sheets of glass plates.

Example 9

Boron was added to an ingot of silicon (Si), and the ingot was heated to melt. The molten liquid that had been heated to 1600° C. was subjected to steam explosion atomization in the same manner as in Example 8. The solid solubilized amount of boron was adjusted to 2 parts by mass relative to 100 parts by mass of silicon.

Thereafter, a heat treatment was carried out for retaining the product temperature at 950° C. for one hour, and then jet mill pulverization was carried out in a nitrogen atmosphere. Thus, a negative electrode active material (D50: 2.6 µm) was obtained. The amount of water/CS at that time was 5 ppm/CS, and the results are presented in Table 1.

The preparation of the negative electrode mixture and the application and heating treatment of the negative electrode mixture were carried out in the same manner as in Example 8, and thus a negative electrode was obtained.

Comparative Examples 1 and 2

Negative electrode active materials were obtained in the same manner as in Example 1, except that the ratio of nitrogen and air of the atmosphere at the time of jet mill pulverization was changed, and the degree of pulverization was changed. The D50 and the amount of water/CS of these materials are presented in the following Table 1.

Furthermore, negative electrodes were obtained in the same manner as in Example 1, except that at the time of preparing the negative electrode mixture, the mixing mass ratio of the fine silicon powder and graphite was changed to fine silicon powder:graphite=50:50 in Comparative Example 1, and to fine silicon powder:graphite=10:90 in Comparative Example 2.

Comparative Example 3

A negative electrode active material was obtained in the same manner as in Example 1, except that the atmosphere at the time of jet mill pulverization was changed to 100% air. The D50 and the amount of water/CS of the material are presented in the following Table 1.

The preparation of the negative electrode mixture and the application and heating treatment of the negative electrode mixture were carried out in the same manner as in Example 8, and thus a negative electrode was obtained.

Comparative Example 4

A negative electrode active material was obtained in the same manner as in Example 1, except that the steam atomization method was not used, and the ingot was pulverized. The D50 and the amount of water/CS of the material are presented in the following Table 1.

The preparation of the negative electrode mixture and the application and heating treatment of the negative electrode mixture were carried out in the same manner as in Example 8, and thus a negative electrode was obtained.

Example 10

An ingot of silicon (Si) was heated to melt as in Example 1, and the molten liquid that had been heated to 1470° C. was subjected to a liquid quenching method using a double roll apparatus ("NEV-A10LW type" manufactured by Nissin Giken Co., Ltd.). At this time, the nozzle inner diameter of the crucible was set to 2.0 mm, and the speed of rotation of the roll was set to 2000 rpm. The powder obtained by the liquid quenching method was pulverized in a nitrogen atmosphere. Other processes were carried out in the same manner as in Example 1, and thus a fine silicon powder (D50: 4.8 µm) was obtained as a negative electrode active material. The amount of water at that time was 72 ppm/CS.

TABLE 1

|  | D50(µm) | Amount of water/CS value |
|---|---|---|
| Examples 1 and 4 | 0.5 | 58 |
| Examples 2, 6, and 8 | 2.5 | 31 |
| Examples 3 and 7 | 4.1 | 62 |
| Example 5 | 1.5 | 57 |
| Example 9 | 2.6 | 5 |
| Example 10 | 4.8 | 72 |
| Comparative Examples 1 and 2 | 6.2 | 149 |
| Comparative Example 3 | 2.5 | 121 |
| Comparative Example 4 | 2.5 | 83 |

<Evaluation of Battery Characteristics>

Lithium secondary batteries were produced using the negative electrodes obtained in Examples and Comparative Examples, and the cycle characteristics upon repeating charging and discharging were analyzed.

(Production of Battery)

A solution obtained by dissolving 1 mol/L of $LiPF_6$ in a mixed solvent of ethylene carbonate and diethyl carbonate at a volume ratio of 1:1, was used as an electrolyte.

A polypropylene porous film was used as a separator. The negative electrode thus obtained was punched into a circle having a diameter of 14 mm, and was subjected to vacuum drying at 160° C. for 6 hours. Then, a 2032 coin cell was assembled in a glove box in an argon atmosphere.

Metal lithium was used as a counter electrode. A solution obtained by dissolving 1 mol/L of $LiPF_6$ in a mixed solvent of ethylene carbonate and diethyl carbonate at a volume ratio of 1:1, was used as an electrolyte. A polypropylene porous film was used as a separator.

(Charge-Discharge Conditions)

Charging was carried out in a constant current-constant voltage charging mode, at a constant current until the battery voltage reached 0.001 V. Thereafter, the time point when the current value that decreased by constant voltage charging control reached 0.1 C/5, was defined as completion of charging.

Discharging was carried out at a constant current until the battery voltage reached 1.5 V.

The rate in the charge-discharge cycle was set to 0.1 C for the first cycle and to 0.2 C from the second cycle in Examples 1 to 7 and Comparative Examples 1 and 2. In the case of Examples 8 and 9 and Comparative Examples 3 and 4, the rate was set to 0.1 C for the first cycle and to 0.2 C for the second cycle.

In regard to the evaluation of the charge-discharge cycle characteristics, the discharge capacities of various cycles in the case in which the discharge capacity of the second cycle was designated as 100% in Examples 1 to 7 and Comparative Examples 1 and 2, and the discharge capacity of the first cycle in Examples 8 and 9 and Comparative Examples 3 and 4 was designated as 100%, were compared as the capacity retention.

In Examples 1 to 7 and Comparative Examples 1 and 2, based on the surface capacity of the coated electrode of 3.5 mAh/cm², 5.39 mA was designated as 1 C. The respective current values of C rate were calculated on the basis of the current value of that 1 C, and the current values were used for the evaluation of capacity retention.

Also, in Examples 8 and 9 and Comparative Examples 3 and 4, 6.93 mA was designated as 1 C.

(Results)

For the coin cells obtained in Examples 1 to 9 and Comparative Examples 1 to 4, the charge-discharge cycle characteristics were analyzed. The results are presented in FIG. 1 to FIG. 3.

As is obvious from the same drawings, it is understood that when the negative electrodes obtained in various Examples were used, the charge-discharge cycle characteristics become more satisfactory, compared with the case of using the negative electrodes obtained in Comparative Examples.

As a result, when the negative electrode obtained in Example 8 was used, the capacity retention after 10 cycles of charging an discharging was 86%, and the same capacity retention was 87% in Example 9. However, when the negative electrode obtained in Comparative Example 3 was used, the capacity retention was 82%, and when the negative electrode obtained in Comparative Example 4 was used, the capacity retention had a low value of 68%.

These results are presented in FIG. 3.

<Peel Test Evaluation>

Each of the negative electrodes obtained in Examples and Comparative Examples was cut to a size of 20 mm×60 mm, and the negative electrode was adhered onto a glass substrate using a double-sided adhesive tape such that the coated surface came on top. Subsequently, cuts were inserted with a cutter in the longitudinal direction and the transverse direction at an interval of 2 mm in a region of 10 mm×50 mm of the coated surface. Thereafter, a commercially available Cellophane tape was adhered to the coated surface, peeling of the coating film at that time was observed, and the state of peeling was evaluated by the following criteria.

(Evaluation Criteria)

⊙ (very good): a state in which the coating film stays neat without the presence of any detached sections.

○ (good): a state in which the coating film has detached sections, but the current collector foil is not seen.

Δ (poor): a state in which a portion of the coating film has been detached, and the current collector foil is seen from the detached sections.

X (very poor): a state in which most of the coating film has been detached, and the current collector foil is seen in a large area.

TABLE 2

|  | Determination |
| --- | --- |
| Example 1 | ○ |
| Example 2 | ○ |
| Example 3 | ○ |
| Example 4 | ○ |
| Example 5 | ○ |
| Example 6 | ○ |
| Example 7 | ○ |
| Example 8 | ⊙ |
| Example 9 | ⊙ |
| Example 10 | ○ |
| Comparative Example 1 | X |
| Comparative Example 2 | X |
| Comparative Example 3 | X |
| Comparative Example 4 | Δ |

(Results)

As is obvious from Table 2, it was found that when the active materials obtained in various Examples were used, the peel strength was higher, that is, the bondability of the coating film was improved, as compared with the case of using the active materials obtained in Comparative Examples. This is contemplated to be because there are no aggregated particles or uneven distribution of particles in the coating film.

When the above results were studied, a conclusion was drawn that from the viewpoint that by enhancing the reactivity of negative electrode active material particles, the cycle characteristics can be improved, and aggregation of the negative electrode active material particles in a slurry can be suppressed, the D50 is preferably 0.1 μm to 5 μm, and the amount of moisture/CS is preferably 0.1 to 80 ppm/(m²/cc).

The invention claimed is:

1. A negative electrode active material for nonaqueous electrolyte secondary batteries, the active material comprising silicon,
　wherein a D50 according to a laser diffraction scattering type particle size distribution analysis method is 0.1 μm to 1.5 μm, and an amount of water, measured at 120° C. to 300° by a Karl-Fischer method, per specific surface area (CS, measured by a laser diffraction particle size distribution analyzer), that is, an amount of water/CS, is 5 to 80 ppm/(m²/cc),
　wherein the negative electrode active material for nonaqueous electrolyte secondary batteries is produced by,
　(a) forming a molten liquid by,
　　(i) heating a silicon-containing material to obtain the molten liquid, or
　　(ii) mixing an additive element with the silicon-containing material and heating the mixture to obtain the molten liquid, or
　　(iii) heating the silicon-containing material to obtain an intermediate molten liquid, and adding the additive element to the intermediate molten liquid, thereby forming the molten liquid, (b) micronizing the molten liquid by atomization or liquid quenching, thereby forming a micronized active material in the form of a powder, and (c) pulverizing and classifying the micronized active material in a nitrogen atmosphere in which air is present in an amount of less than 1%, and the balance is composed of nitrogen, to thereby adjust the particle size of the micronized active material.

2. The negative electrode active material for nonaqueous electrolyte secondary batteries according to claim 1, wherein the active material comprises one or two or more elements selected from a group consisting of transition metal elements, semi-metal elements or metal elements of Group 3, semi-metal elements or metal elements of Group 4, and non-metal or semi-metal elements of Group 5.

3. The negative electrode active material for nonaqueous electrolyte secondary batteries according to claim 1, wherein one or two or more elements selected from the group consisting of transition metal elements, semi-metal elements or metal elements of Group 3, semi-metal elements or metal elements of Group 4, and non-metal or semi-metal elements of Group 5, are solid-solubilized in the active material.

4. The negative electrode active material for nonaqueous electrolyte secondary batteries according to claim 1, wherein the active material comprises one or two or more elements selected from a group consisting of Ni, B, Cu, Co, Ti, Fe, In, Nb and Ag.

5. The negative electrode active material for nonaqueous electrolyte secondary batteries according to claim 1, wherein one or two or more elements selected from the group consisting of Ni, B, Cu, Co, Ti, Fe, In, Nb and Ag are solid-solubilized in the active material.

6. The negative electrode active material for nonaqueous electrolyte secondary batteries according to claim 4, wherein the active material comprises boron.

7. The negative electrode active material for nonaqueous electrolyte secondary batteries according to claim 5, wherein boron is solid-solubilized in the active material.

8. A negative electrode for nonaqueous electrolyte secondary batteries, the negative electrode comprising the negative electrode active material for nonaqueous electrolyte secondary batteries according to claim 1, and a binder.

9. A negative electrode for nonaqueous electrolyte secondary batteries, the negative electrode comprising the negative electrode active material for nonaqueous electrolyte secondary batteries according to claim 1, graphite, and a binder.

10. The negative electrode for nonaqueous electrolyte secondary batteries according to claim 8, wherein the binder is a polyimide.

11. A nonaqueous electrolyte secondary battery comprising the negative electrode according to claim 8.

12. The negative electrode for nonaqueous electrolyte secondary batteries according to claim 9, wherein the binder is a polyimide.

13. A nonaqueous electrolyte secondary battery comprising the negative electrode according to claim 9.

14. A nonaqueous electrolyte secondary battery comprising the negative electrode according to claim 10.

* * * * *